United States Patent
Ohashi

(10) Patent No.: US 8,643,730 B2
(45) Date of Patent: Feb. 4, 2014

(54) IMAGING DEVICE AND IMAGE CAPTURING METHOD

(75) Inventor: Masataka Ohashi, Kanagawa (JP)

(73) Assignee: Samsung Electronics Co., Ltd (KR)

( * ) Notice: Subject to any disclaimer, the term of this patent is extended or adjusted under 35 U.S.C. 154(b) by 201 days.

(21) Appl. No.: 13/324,392

(22) Filed: Dec. 13, 2011

(65) Prior Publication Data

US 2012/0154666 A1 Jun. 21, 2012

(30) Foreign Application Priority Data

Dec. 20, 2010 (JP) ................................. 2010-283829
Dec. 1, 2011 (KR) ........................ 10-2011-0127520

(51) Int. Cl.
*H04N 5/228* (2006.01)
*H04N 5/232* (2006.01)

(52) U.S. Cl.
USPC ................... 348/208.12; 348/222.1; 348/345; 348/333.04

(58) Field of Classification Search
USPC ............ 348/208.12, 222.1, 345, 346, 333.02, 348/333.04, 333.13, E5.045
See application file for complete search history.

(56) References Cited

U.S. PATENT DOCUMENTS

| | | | | |
|---|---|---|---|---|
| 6,078,758 A | * | 6/2000 | Patton et al. | 396/312 |
| 7,864,243 B2 | * | 1/2011 | Tsutsumi | 348/373 |
| 8,351,633 B2 | * | 1/2013 | Lassally | 381/359 |
| 2008/0019551 A1 | * | 1/2008 | Watanabe | 381/360 |
| 2011/0228119 A1 | * | 9/2011 | Maruyama | 348/222.1 |
| 2013/0039523 A1 | * | 2/2013 | Van Dijk | 381/356 |

FOREIGN PATENT DOCUMENTS

| | | |
|---|---|---|
| JP | 2006245792 | 9/2006 |
| JP | 2006349744 | 12/2006 |

* cited by examiner

*Primary Examiner* — Hung Lam
(74) *Attorney, Agent, or Firm* — The Farrell Law Firm, P.C.

(57) ABSTRACT

An imaging device is provided which includes an imaging unit for converting light passing through a focus lens into an image signal to obtain an image, an arrangement unit for arranging an evaluation frame on the image obtained by the imaging unit, a determination unit for determining a focusing position of the focus lens based on pixel value evaluation in the evaluation frame arranged by the arrangement unit, and a driving unit for moving the focus lens to the focusing position determined by the determination unit, in which the arrangement unit re-arranges the evaluation frame by modifying the evaluation frame when a straight-line component appearing on the image overlaps with the evaluation frame.

18 Claims, 13 Drawing Sheets

DOWNSIZING EVALUATION FRAME BY FIXING VERTEX V1

DOWNSIZING EVALUATION FRAME BY FIXING VERTEX V1

IMAGING DEVICE AND IMAGE CAPTURING METHOD

PRIORITY

This application claims priority under 35 U.S.C. §119(a) to a Japanese Patent Application filed in the Japan Patent Office on Dec. 20, 2010 and assigned Serial No. JP 283829/2010, and a Korean Patent Application filed in the Korean Patent Office on Dec. 1, 2011 and assigned Serial No. 10-2011-0127520, the entire disclosures of which are hereby incorporated by reference.

BACKGROUND OF THE INVENTION

1. Field of the Invention

The present invention generally relates to an imaging device and an image capturing method.

2. Description of the Related Art

Generally, when an object is imaged or photographed by using an imaging device having an auto focus function, if another object acting as a shield exists between the object and the imaging device, the shield is focused. The shield can be any object such as a metallic mesh, a shelf, a fence, a window frame, etc.

To solve such a problem, conventionally, a user designates a point on the object and a point on a non-object, thus improving the precision of auto focusing. In addition, a mode for limiting a scan range of a focus lens position is set to make it easy to separate the object and the non-object located front and rear with respect to each other.

However, in the conventional schemes described above, the user is highly likely to miss an imaging opportunity during designation of the points on the object and the non-object. Moreover, if the shield is a structure having a thin-rod shape or line shape, it is not easy to designate a point on the shield. Furthermore, if a continuous pattern exists in a focal length in a case of multi-point focus, it can be recognized that a metallic mesh is being in focus, but this method is effective only in a limited situation where an imaging plane and the metallic mesh have a parallel positional relationship.

In addition, in cases of a short distance between the object and the shield, even if the scan range of the focus lens position is limited, focusing is possible on both sides of the object and the shield within the limited scan range, making it impossible to separate the object and the shield.

SUMMARY OF THE INVENTION

Therefore, the present invention provides an imaging device and an image capturing method by which an object can be in focus without a user's auxiliary manipulation in a situation where a shield exists in front of an object.

According to an aspect of the present invention, an imaging device is provided which includes an imaging unit for converting light passing through a focus lens into an image signal to obtain an image, an arrangement unit for arranging an evaluation frame on the image obtained by the imaging unit, a determination unit for determining a focusing position of the focus lens based on pixel value evaluation in the evaluation frame arranged by the arrangement unit, and a driving unit for moving the focus lens to the focusing position determined by the determination unit, in which the arrangement unit re-arranges the evaluation frame by modifying the evaluation frame when a straight-line component appearing on the image overlaps with the evaluation frame.

According to another aspect of the present invention, an image capturing method is provided which includes converting light passing through a focus lens into an image signal to obtain an image, arranging an evaluation frame on the image, determining a focusing position of the focus lens based on pixel value evaluation in the evaluation frame, moving the focus lens to the determined focusing position, and re-arranging the evaluation frame by modifying the evaluation frame when a straight-line component appearing on the image overlaps with the evaluation frame.

According to another aspect of the present invention, an imaging device is provided which includes an imaging unit for converting light passing through a focus lens into an image signal to obtain an image, an arrangement unit for arranging an evaluation frame on the image obtained by the imaging unit, a determination unit for determining a focusing position of the focus lens based on pixel value evaluation in the evaluation frame arranged by the arrangement unit, and a driving unit for moving the focus lens to the focusing position determined by the determination unit, in which the arrangement unit re-arranges the evaluation frame by downsizing and moving the evaluation frame when a straight-line component appearing on the image overlaps with the evaluation frame.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE PRESENT INVENTION

Figure 1:
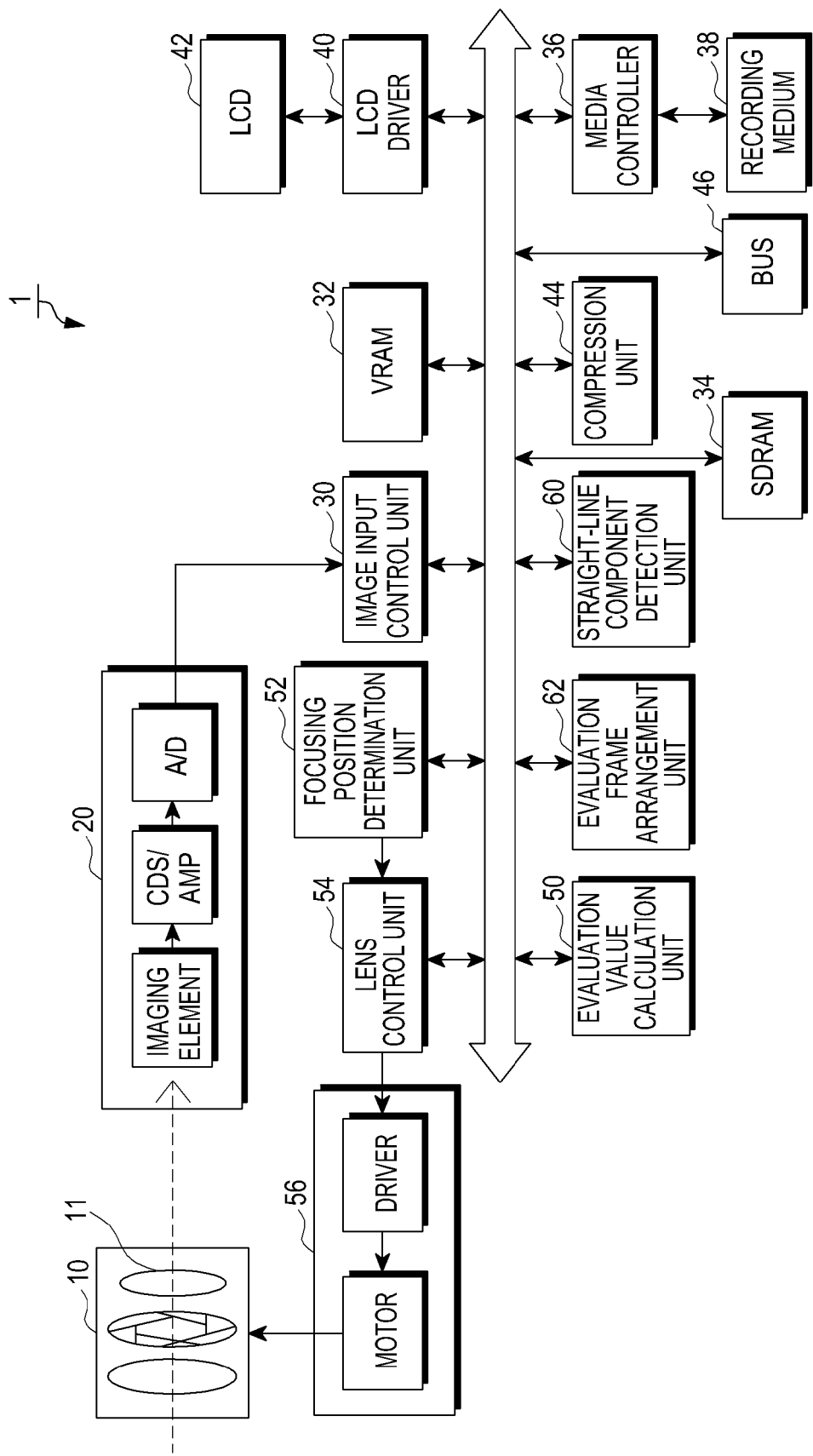
FIG. 1 is a block diagram of an imaging device according to an embodiment of the present invention.

Hereinafter, certain embodiments of the present invention will be described in detail with reference to the accompanying drawings. In the specification and drawings, components having like functions will be referred to with like reference numerals to avoid repetitive description.

1. Example of Imaging Device

FIG. 1 is a block diagram of an imaging device 1 according to an embodiment of the present invention. Referring to FIG. 1, the imaging device 1 includes a lens unit 10, an imaging unit 20, an image input control unit 30, a Video Random Access Memory (VRAM) 32, a Synchronous Dynamic Random Access Memory (SDRAM) 34, a media controller 36, a recording medium 38, a Liquid Crystal Display (LCD) 42, an LCD driver 40, a compression unit 44, a bus 46, an evaluation value calculation unit 50, a focusing position determination unit 52, a lens control unit 54, a driving unit 56, a straight-line component detection unit 60, and an evaluation frame arrangement unit 62.

The lens unit 10 includes an optical lens group and related components for the imaging device 1 to image incident light from the real world. In this embodiment, the lens group of the lens unit 10 includes a focus lens 11. The light passing through the focus lens 11 is incident to an imaging element of the imaging unit 20, which will be described below. For example, the lens unit 10 may include a zoom lens and an aperture apparatus.

The imaging unit 20 converts the light incident through the lens group of the lens unit 10 into an electric image signal to obtain an image. The imaging unit 20 typically includes an imaging element such as a Charge Coupled Device (CCD), a Complementary Metal-Oxide Semiconductor (CMOS), or the like, a signal processing circuit such as a Correlated Double Sampling (CDS) circuit, an amplification circuit (AMP), etc., and an Analog-to-Digital (A/D) conversion circuit. In the imaging unit 20, the light incident to the imaging element is converted into an electric signal by photoelectric conversion. Thus, the electric signal is standardized and amplified by the signal processing circuit, and then is converted into an image signal in digital form.

The image input control unit 30 controls an image input from the imaging unit 20. For example, the image input control unit 30 displays an image input from the imaging unit 20 on the LCD 42 in a live-view mode. The image input control unit 30 may record an image input from the imaging unit 20 on the recording medium 38 according to, for example, a trigger such as pressing of a shutter button or lapse of a self timer.

The VRAM 32 is a memory for temporarily storing the image input from the imaging unit 20. The image stored by the VRAM 32 is referred to in processing by the evaluation value calculation unit 50 and the straight-line component detection unit 60, which will be described below.

The SDRAM 34 is used as a temporary storage region for various processing operations by the imaging device 1. Software for achieving processing by the imaging device 1 is stored in the SDRAM 34 and then executed by each component of the imaging device 1.

The media controller 36 controls data read/write operations with respect to the recording medium 38. The recording medium 38 records an image formed by the imaging device 1, a picture, and other various data. The recording medium 38 may be a medium embedded in the imaging device 1 or may be a removable medium. The imaging device 1 may include a plurality of recording media 38.

The LCD driver 40 is a driver for controlling images displayed on the LCD 42. The LCD 42 displays various images, such as an image prior to imaging capture, which is input from the imaging unit 20, an image formed by pressing of a shutter button, a user interface image for changing settings regarding imaging by a user, etc., on the screen of the LCD. The user interface image displayed on the LCD 42 may include, for example, an image regarding a user interface for turning on/off a shield exclusion mode, which will be described below, by the user.

The compression unit 44 compresses the image formed by the imaging device 1 according to a predetermined image compression format to reduce the amount of data of the image. The predetermined image compression format may be an arbitrary format, for example, Joint Photographic Experts Group (JPEG), JPEG200, Tag Image File Format (TIFF), or the like.

The bus 46 interconnects the image input control unit 30, the VRAM 32, the SDRAM 34, the media controller 36, the LCD driver 40, the compression unit 44, the evaluation value calculation unit 50, the focusing position determination unit 52, the lens control unit 54, the straight-line component detection unit 60, and the evaluation frame arrangement unit 62.

The evaluation value calculation unit 50 evaluates a pixel value in an evaluation frame arranged in the image by the evaluation frame arrangement unit 62 to calculate an Auto Focus (AF) evaluation value.

Figure 2:
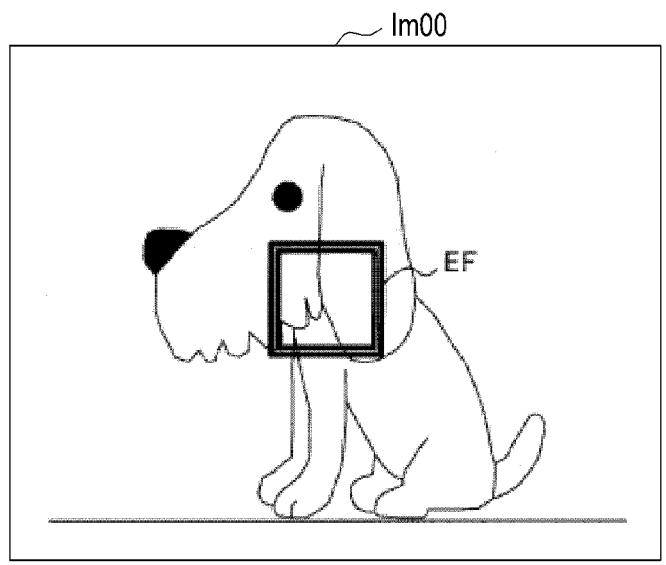
FIG. 2 is a diagram for describing an Evaluation Frame (EF) arranged in an image according to an embodiment of the present invention.

FIG. 2 is a diagram describing an evaluation frame (EF) arranged in an image according to an embodiment of the present invention.

The AF evaluation value calculated by the evaluation value calculation unit 50 is typically an image contrast value. For example, the evaluation value calculation unit 50 filters an image signal within the evaluation frame through a bandpass filter, thus extracting a high-frequency component and calculating an integrated value (i.e., a contrast value) of the extracted high-frequency component. Calculation of the AF evaluation value by the evaluation value calculation unit 50 is performed with respect to each of a plurality of focus lens positions within a scan range according to an AF initiation trigger, for example, such as half-pressing of a shutter button. The AF evaluation value calculated by the evaluation value calculation unit 50 may also be a value that is different from the contrast value.

The focusing position determination unit 52 determines a focusing position of a focus lens based on the AF evaluation value calculated by the evaluation value calculation unit 50. In an embodiment of the present invention, the term "focusing position" means the position of the focus lens determined by the imaging device 1 as a position at which an object is in focus. The focusing position determination unit 52 may determine, as the focusing position, a position at which the AF evaluation value is highest (the contrast value has a peak value) among al plurality of focus lens positions within the scan range.

The lens control unit 54 is a controller for controlling settings of the lens unit 10. The settings of the lens unit 10 may include, for example, a focus lens position, an aperture value, a shutter speed, zoom intensity, etc. In this embodiment, once a focusing position is determined by the focusing position determination unit 52, the lens control unit 54 drives the driving unit 56 and moves the focus lens to the determined focusing position.

The driving unit 56 includes a driver and a motor, and changes the relationships between the physical structures of the lens group and the related components of the lens unit 10 under control of the lens control unit 54. For example, once the focusing position is determined by the focusing position determination unit 52, the driving unit 56 moves the focus lens to the determined focusing position. By doing so, the image can be formed in a state where the object is in focus.

Referring to FIGS. 3 through 6, AF control in a contrast scheme will be described in more detail. The AF control in the contrast scheme determines a focusing position based on a high contrast value and a low contrast value of the image signal obtained by interposing the lens. As mentioned previously, the contrast value of the image corresponds to the AF evaluation value which is generated by extracting a high-frequency component of the image signal within the (AF) evaluation frame. For a constant focal length, i.e., a constant zoom intensity, a focus lens position and an object distance are equivalent and have the same meaning.

Figure 3:
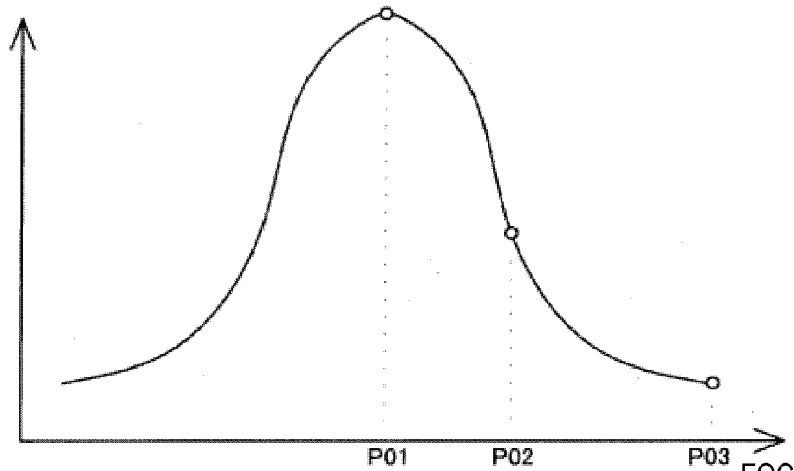
FIG. 3 is a diagram including a graph illustrating a first example of an AF (Auto Focus) evaluation value with respect to a focus lens position according to an embodiment of the present invention.
Figure 3:
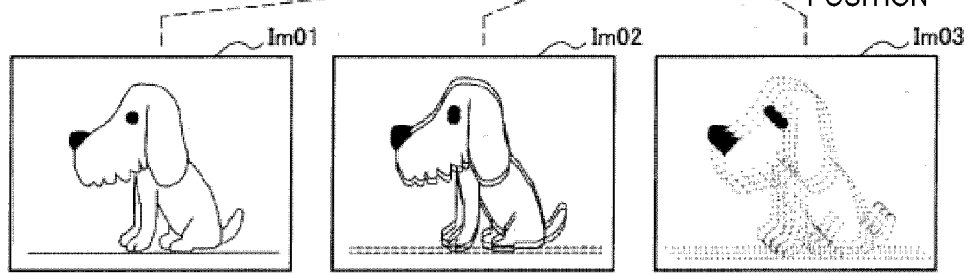

FIG. 3 is a diagram and a graph illustrating a first example of an AF evaluation value with respect to a focus lens position according to an embodiment of the present invention.

When an AF evaluation value is calculated at each of a plurality of focus lens positions, an object is in focus (see an image Im01) at a focus lens position (e.g., P01) at which the AF evaluation value has a peak value. On the other hand, at focus lens positions (e.g., P02 and P02) at which the AF evaluation value does not have the peak value), the object is out of focus and a blurred image of the object is obtained (see images Im02 and Im03). In the example shown in FIG. 3, position P01 is the focusing position.

Figure 4:
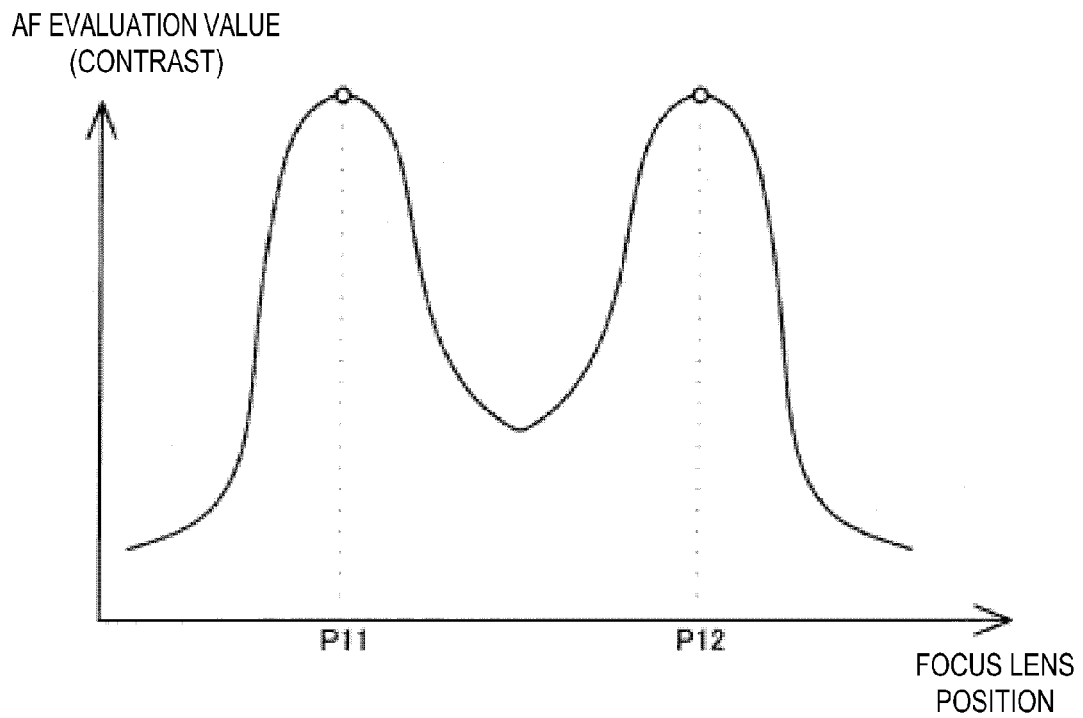
FIG. 4 is a graph illustrating a second example of an AF evaluation value with respect to a focus lens position according to an embodiment of the present invention.

FIG. 4 is a graph illustrating a second example of an AF evaluation value with respect to a focus lens position according to an embodiment of the present invention.

In the example shown in FIG. 4, there are two focus lens positions (e.g., P11 and P12) at which the AF evaluation value has a peak value. In this case, one of them is a position at which the object is in focus and the other may be a position at which a shield is in focus.

Figure 5:
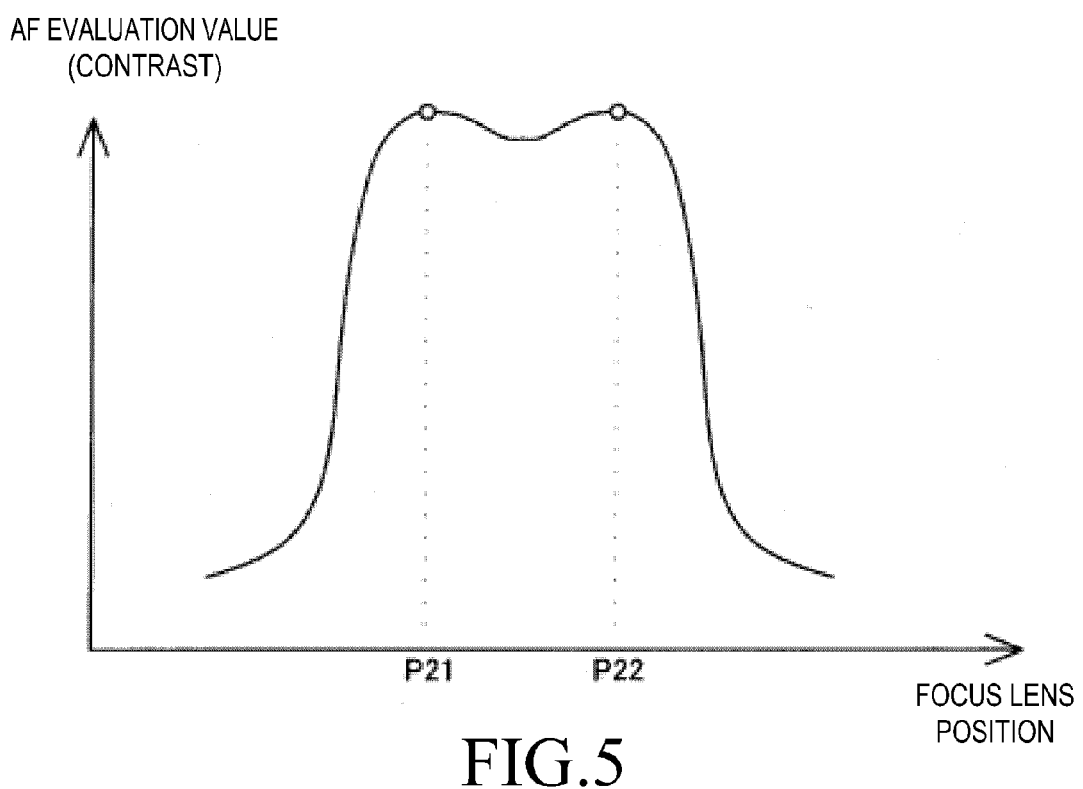
FIG. 5 is a graph illustrating a third example of an AF evaluation value with respect to a focus lens position according to an embodiment of the present invention.

FIG. 5 is a graph illustrating a third example of an AF evaluation value with respect to a focus lens position according to an embodiment of the present invention.

When a shield, such as a gold net, exists between the object and the imaging device 1 and the object and the shield are located relatively close to each other, an AF evaluation value curve like in the example shown in FIG. 5 is obtained. When the focal length (zoom intensity) is set in a wide-angle side and thus the depth of field is deep, peak position separation between the object and the shield is not properly made and the AF evaluation value curve like in the example shown in FIG. 5 is typically obtained. Herein, the term "depth of field" means a range in which the object seems to be in focus around the focusing position. In general, the depth of field is deep in the wide-angle side of optical zoom, and the depth of field is shallow in the telephoto side. Actually, however, a position at which an object is in focus is a point in the depth of field. In the examples shown in FIGS. 4 and 5, with a conventional AF function, it is difficult to properly determine the focusing position without the user's auxiliary manipulation to focus the object.

Figure 6:
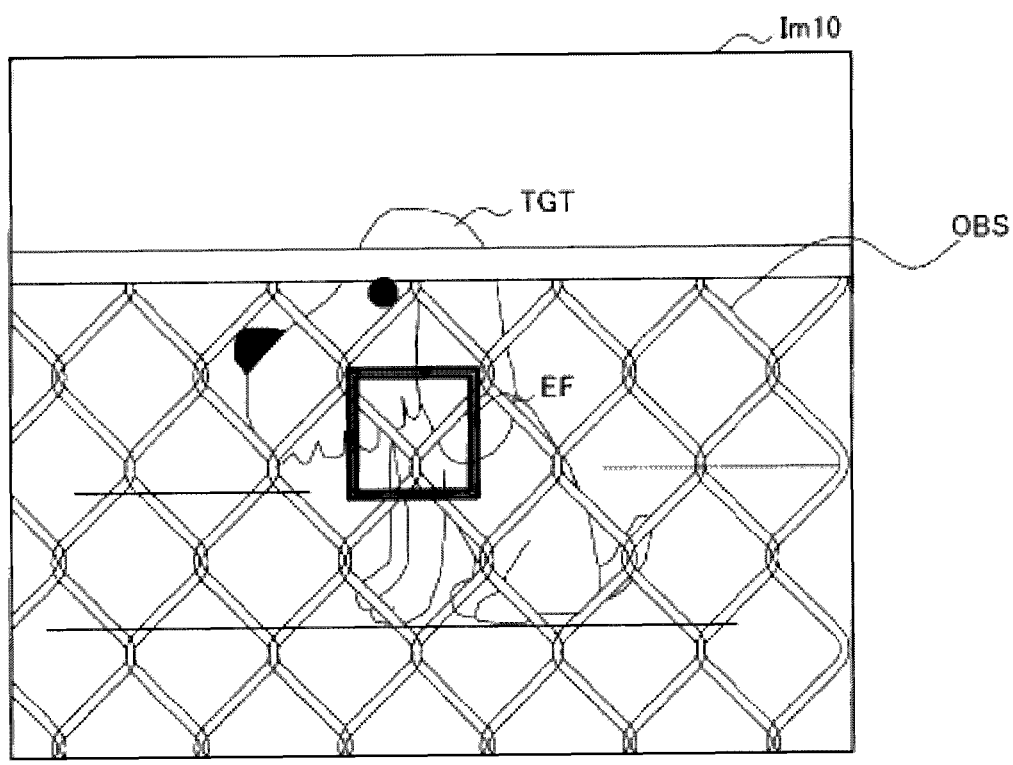
FIG. 6 is a diagram illustrating an example of a situation where an object and a shield overlap with each other according to an embodiment of the present invention.

FIG. 6 is a diagram illustrating an example of a situation where the object and the shield overlap with each other according to an embodiment of the present invention.

In image Im10 shown in FIG. 6, a shield OBS (OBStruction) exists in front of an object TGT (TarGeT). In this case, both the object TGT and the shield OBS are reflected within the evaluation frame EF, and the AF evaluation value curve is as shown in the examples shown in FIGS. 4 and 5. However, since in this situation, the shield OBS reflected in the evaluation frame EF cannot be resolved by simply moving the evaluation frame EF, and thus it is not easy to properly determine the focusing position.

The structure of the imaging device 1 according to this embodiment of the present invention accomplishes evaluation frame re-arrangement as described herein, thus automatically determining a proper focusing position. Referring back to FIG. 1, the description of the structure of the imaging device 1 will be completed.

The straight-line component detection unit 60 detects a straight-line component in the image obtained by the imaging unit 20. The straight-line component detection unit 60 half-converts an edge detected in the image, generates a histogram with the half-converted function value to identify a peak point, thus detecting the straight-line components. Alternatively, the straight-line component detection unit 60 may detect the straight-line components by applying, for example, a thinning algorithm, such as a Hilditch method, a Zhang Suen method, or the like, to a region divided by the edge in the image.

The evaluation frame arrangement unit 62 arranges an evaluation frame for calculating the AF evaluation value on the image obtained by the imaging unit 20. The initial arrangement of the evaluation frame may be made at a fixed position, such as a preset center of the image. In addition, the initial size and shape of the evaluation frame may be preset to be any fixed size and shape. In the current embodiment, the evaluation frame arrangement unit 62 re-arranges the evaluation frame by modifying the evaluation frame when one or more straight-line components detected by the straight-line component detection unit 60 overlap with the evaluation frame. The evaluation frame unit 62 may modify the evaluation frame by downsizing or moving the evaluation frame. In the present invention, a mode in which the re-arrangement of the evaluation frame is automatically performed will be referred to as a shield exclusion mode.

For example, the evaluation frame arrangement unit 62, after fixing one point (e.g., one point among four vertices of a rectangle) of the evaluation frame, may downsize the evaluation frame such that any side of the evaluation frame does not overlap with any straight-line component. In addition, if the straight-line components form a polygon, the evaluation frame arrangement unit 62 may move the evaluation frame such that the center of the evaluation frame matches the center of the polygon formed by the straight-line components. In this case, if the one or more straight-line components overlap with the evaluation frame even after the movement of the evaluation frame, the evaluation frame arrangement unit 62, after fixing the center of the evaluation frame again, may downsize the evaluation frame such that any side of the evaluation frame does not overlap with any straight-line component. Two embodiments regarding the re-arrangement of the evaluation frame by the evaluation frame arrangement unit 62 will be described below in more detail.

2. Imaging Processing Flow

Figure 7:
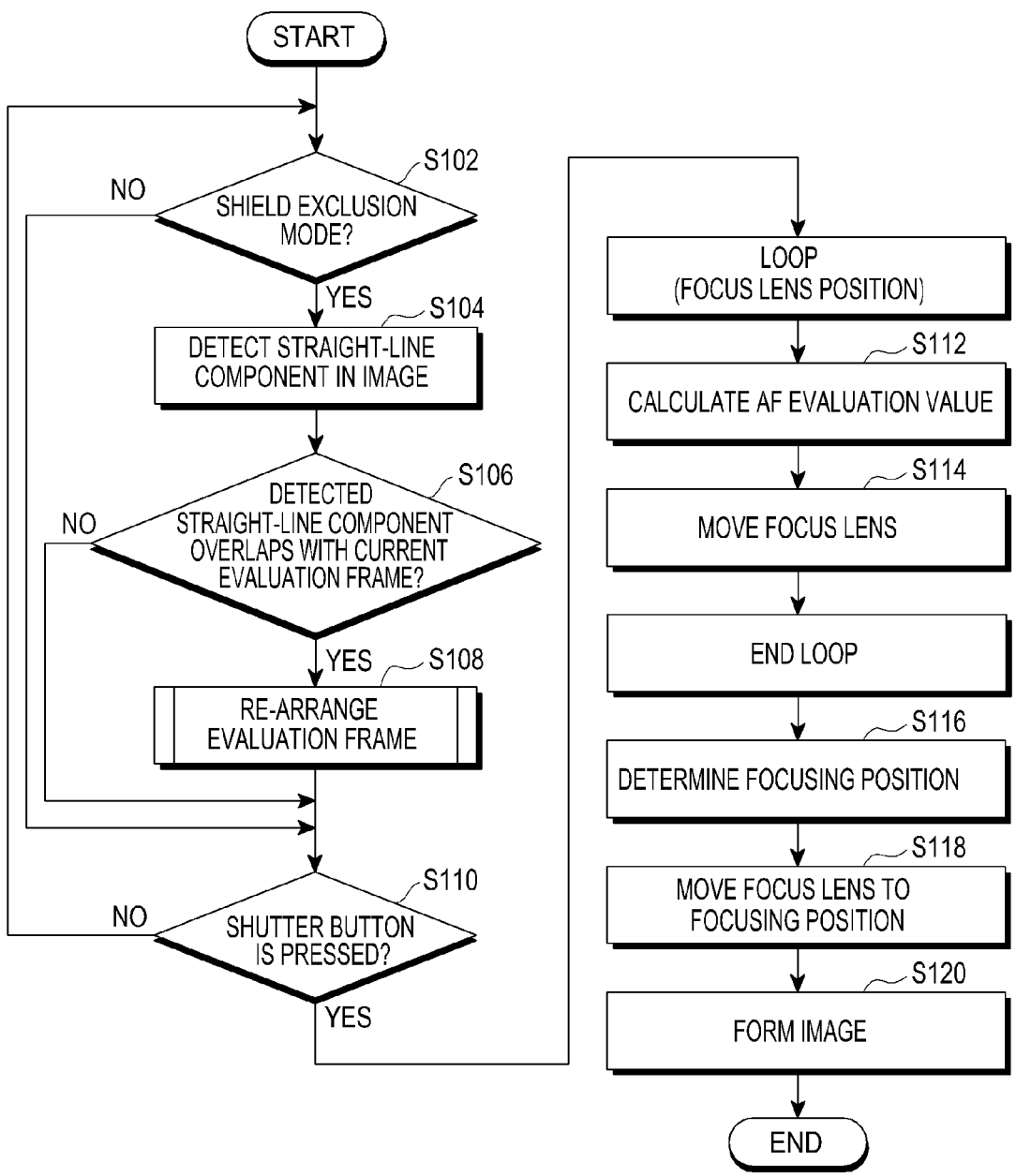
FIG. 7 is a flowchart illustrating an imaging processing procedure according to an embodiment of the present invention.

FIG. 7 is a flowchart illustrating an imaging processing procedure according to an embodiment of the present invention.

The imaging processing procedure shown in FIG. 7 may be repeated, for example, when the imaging device 1 is in a still image capturing mode.

The straight-line component detection unit 60 determines in step S102 whether a current AF function mode is the shield exclusion mode. Herein, if the current AF function mode is not the shield exclusion mode, the procedure in steps S104 through S108 is skipped. If the current AF function mode is the shield exclusion mode, the straight-line component detection unit 60 detects straight-line components appearing on the image obtained by the imaging unit 20 in step S104.

Figure 8:
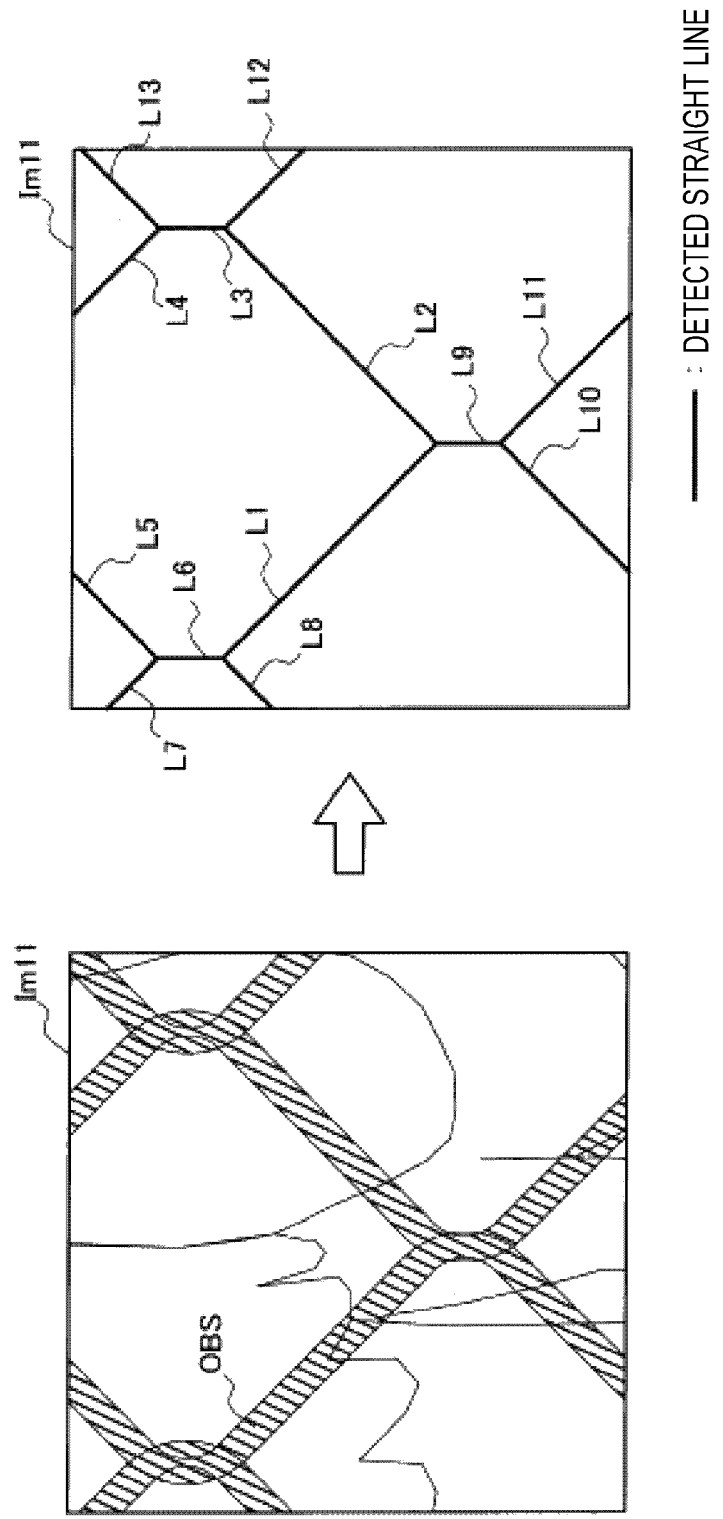
FIG. 8 is a diagram illustrating an example of a result of detection of straight-line components according to an embodiment of the present invention.

FIG. 8 is a diagram illustrating an example of a result of detection of straight-line components according to an embodiment of the present invention.

In the example shown in FIG. 8, straight-line components L1 through L13 corresponding to a shield (dashed part) reflected on image Im11 are a result of detection of straight-line components.

Next, the evaluation frame arrangement unit 62 determines in step S106 whether straight-line components detected by the straight-line component detection unit 60 overlap with a current evaluation frame. The determination of whether the straight-line components overlap with the current evaluation frame may be performed by, for example, verifying if there is an intersection between a side of the evaluation frame and straight-line components, as will be described below.

In this regard, a detailed description will be made with reference to FIGS. 9 and 10.

Figure 9:
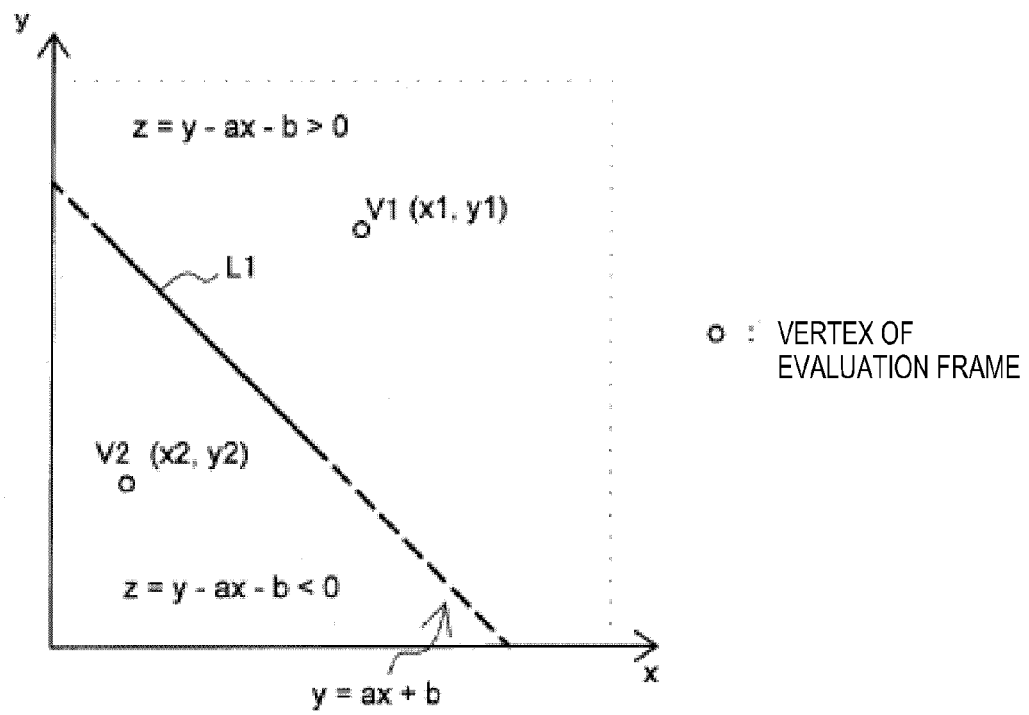
FIG. 9 is a first diagram of a graph describing a decision of overlap between straight-line components and an evaluation frame according to an embodiment of the present invention.
Figure 10:
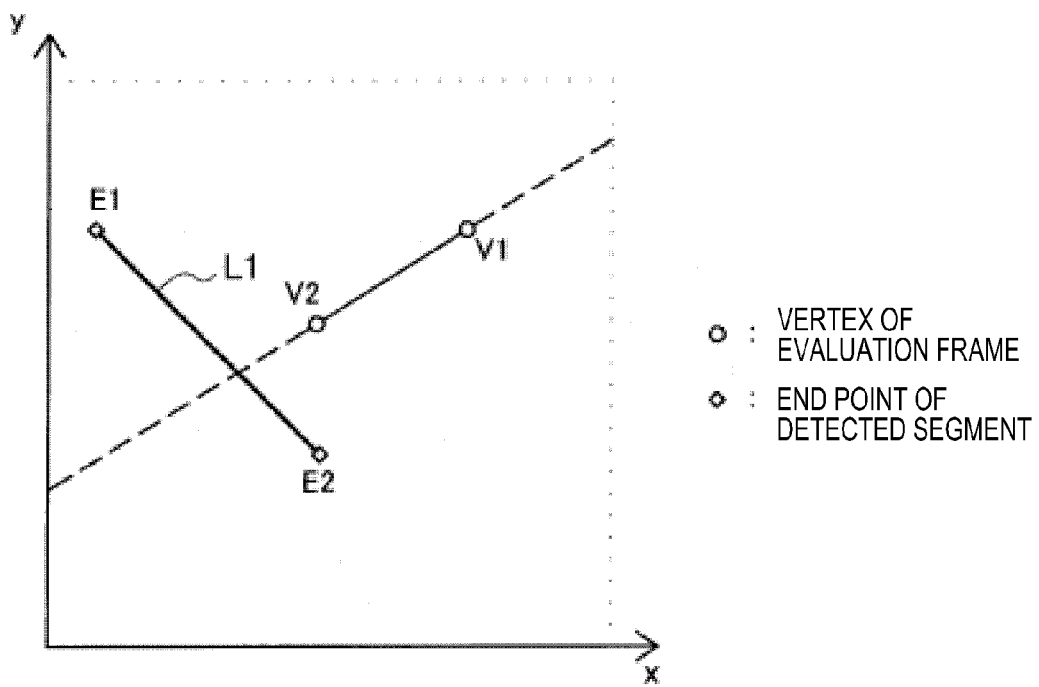
FIG. 10 is a second diagram of a graph describing a decision of overlap between straight-line components and an evaluation frame according to an embodiment of the present invention.

FIG. 9 is a first diagram of a graph describing a decision of overlap between straight-line components and an evaluation frame according to an embodiment of the present invention, and FIG. 10 is a second diagram of a graph describing a decision of overlap between straight-line components and an evaluation frame according to an embodiment of the present invention.

Referring to FIGS. 9 and 10, a straight-line component L1 is assumed to be expressed as $y=ax+b$ on an x-y plane corresponding to an imaging plane, and vertices on both ends of a side of the evaluation frame are assumed to be V1 (x1, y1) and V2 (x2 and y2). If both V1 and V2 are located on the same side with respect to the straight-line component L1, the straight-line component L1 and a side connecting the vertex V1 and the vertex V2 do not intersect each other (FIG. 9). If V1 and V2 are located on different sides with respect to the straight-line component L1, the straight-line component L1 and the side connecting the vertex V1 and the vertex V2 intersect each other (FIG. 10). It can be determined which side with respect to the straight-line component L1 each vertex is located, by verifying a sign of a value of z through substitution of coordinates of the vertex to a determination equation $z=y-ax-b$. For example, if a sign corresponding to a result of substitution of the coordinates of the vertex V1 and a sign corresponding to a result of substitution of the coordinates of the vertex V2 are different from each other, it can be determined that the vertex V1 and the vertex V2 are located on different sides with respect to the straight-line component L1. If the signs are the same as each other, it can be determined that the vertex V1 and the vertex V2 are located on the same side.

Referring to FIG. 10, if the straight-line component L1 is a segment, a side connecting the vertex V1 and the vertex V2 is assumed to be a straight-line component and the above-described verification is performed with respect to two end points of the straight-line component L1, thereby determining whether there is an intersection between the straight-line component L1 and the side connecting the vertices V1 and V2. For example, if two results of the verification both indicate existence of an intersection, the straight-line component L1 and the side connecting the vertices V1 and V2 intersect each other. Otherwise, the straight-line component L1 and the side connecting the vertices V1 and V2 do not intersect each other. The evaluation frame arrangement unit 62 performs such determination with respect to any combination of a straight-line component detected by the straight-line component detection unit 60 and a side of the evaluation frame. However, the above-described method for determining whether a straight-line component and an evaluation frame overlap with each other is merely an example, and other methods may also be used.

If it is determined that any straight-line component does not overlap with the current evaluation frame in step S106, evaluation frame re-arrangement processing of step S108 is skipped. If it is determined that a straight-line component overlaps with the current evaluation frame in step S106, the evaluation frame arrangement unit 62 performs evaluation frame re-arrangement processing to avoid overlap between the straight-line component and the evaluation frame, in step S108.

In step S110, the image input control unit 30 determines an AF initiation trigger such as, for example, pressing of a shutter button. Herein, if AF is not initiated, the procedure returns to step S102. Also in this case, an image may not be displayed on the screen of the LCD 42. If it is determined that there is an AF initiation trigger, the procedure goes to the focus lens position loop beginning with step S112.

Processing in steps S112 and S114 are repeated in a loop with respect to a plurality of focus lens positions. In step S112, the evaluation value calculation unit 50 calculates an AF evaluation value, i.e., a contrast value, in the evaluation frame arranged at that time. The lens control unit 54 and the driving unit 56 move the focus lens to the next focus lens position in step S114. As a result of loop processing, the AF evaluation value is calculated with respect to each of the plurality of focus lens positions and the loop ends and the procedure moves to step S116.

Next, the focusing position determination unit 52 determines in step S116 a focus lens position at which the AF evaluation value calculated by the evaluation value calculation unit 50 is a peak value as a focusing position. In step S118, the lens control unit 54 and the driving unit 56 move the focus lens to the focusing position determined by the focusing position determination unit 52. In step S120, the image input unit 30 forms an image in a state where the object is in focus. If the shutter button is half-pressed in step S110, the image input unit 30 may wait until full-pressing of the shutter button is detected, and then form an image upon the detection.

3. First Embodiment of Evaluation Frame Re-arrangement Processing

A description will now be made of the first embodiment of evaluation frame re-arrangement processing of step S108 shown in FIG. 7.

3-1. Processing Flow

Figure 11:
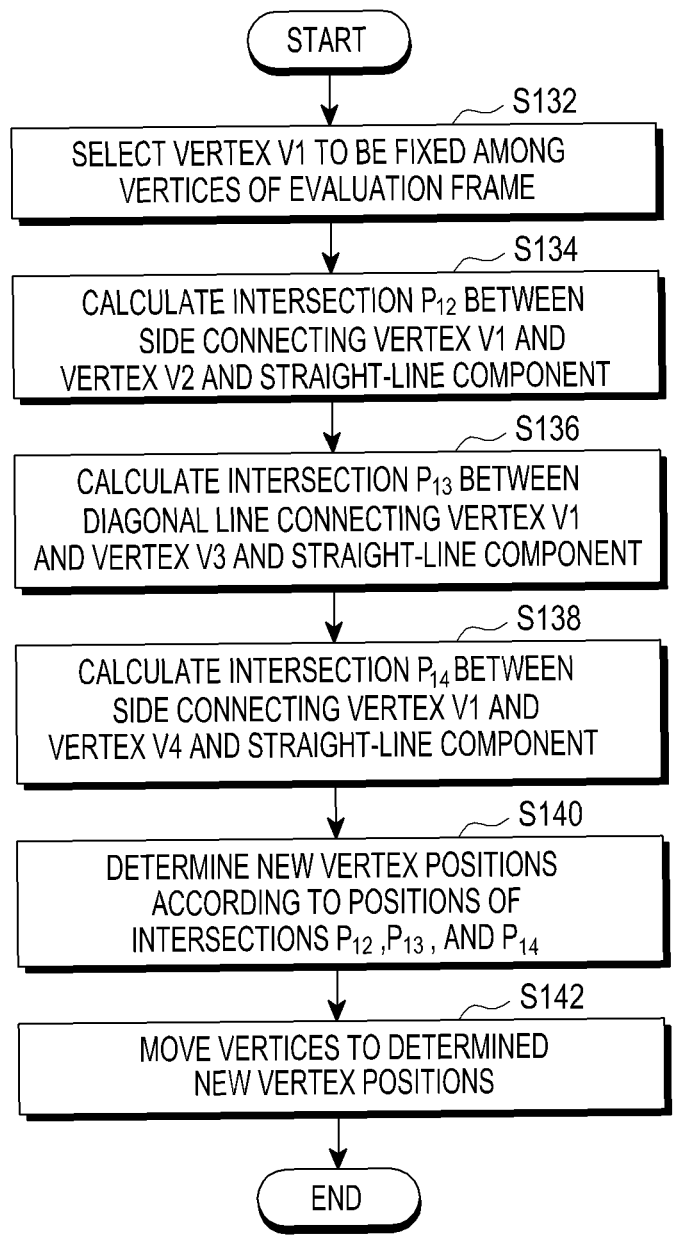
FIG. 11 is a flowchart illustrating an evaluation frame re-arrangement process according to an embodiment of the present invention.

FIG. 11 is a flowchart illustrating an evaluation frame re-arrangement process according to an embodiment of the present invention.

Figure 12:
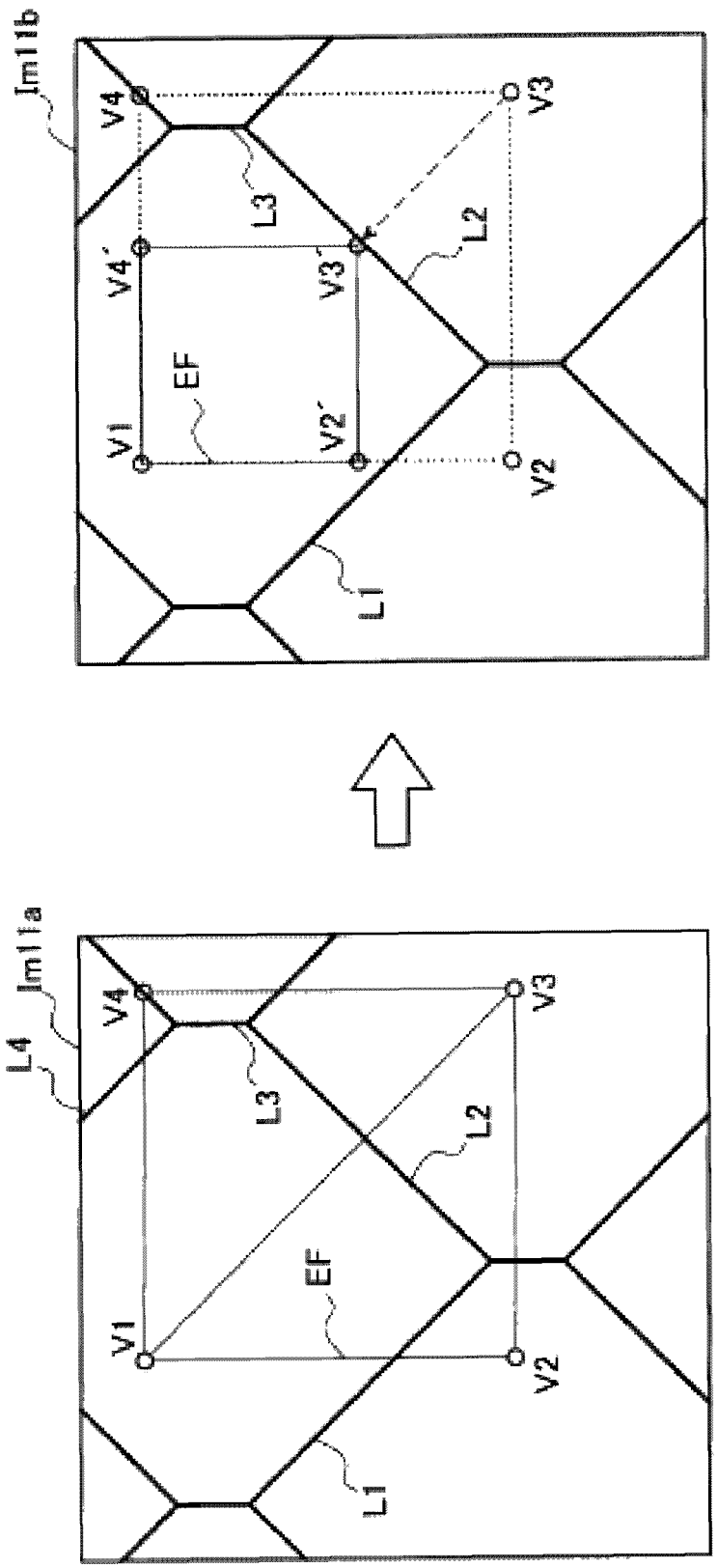
FIG. 12 is a diagram illustrating a result of re-arrangement of an evaluation frame according to an embodiment of the present invention.

Referring to FIG. 11, the evaluation frame arrangement unit 62 selects one vertex V1 to be fixed (i.e., which is not to be moved) among four vertices of the evaluation frame at that time in step S132. The vertex V1 may be, for example, a vertex closest to the center of an image or a predetermined particular vertex. Herein, the left-top vertex in a rectangular evaluation frame will be referred to as a vertex V1, and left-bottom, right-bottom, and right-top vertices will be referred to as vertices V2, V3, and V4, respectively, as seen in FIG. 12.

In step S134, the evaluation frame arrangement unit 62 calculates an intersection P12 between a straight-line component and a side connecting the selected vertex V1 and the vertex V2. If the side connecting the vertex V1 and the vertex V2 does not intersect any straight-line component, the procedure skips step S134. If the side connecting the vertex V1 and the vertex V2 intersects at least one straight-line component, an intersection closest to the vertex V1 is calculated as the intersection P12. Likewise, the evaluation frame arrangement unit 62 calculates an intersection P13 between a straight-line component and a diagonal line connecting the selected vertex V1 and the vertex V3, in step S136. The evaluation frame arrangement unit 62 also calculates an intersection P14 between a straight-line component and a side connecting the selected vertex V1 and the vertex V4 in step S138.

In step S140, the evaluation frame arrangement unit 62 determines new positions of the vertices V2, V3, and V4 according to the intersections $P_{12}$, $P_{13}$, and $P_{14}$ calculated in steps S134, S136, and S138. For example, with reference to FIG. 12, if any one of the intersections $P_{12}$, $P_{13}$, and $P_{14}$ exists, a new position V3' ($V3'_x$, $V3'_y$) of the vertex V3 located diagonally with respect to the fixed vertex V1 may be determined according to Equation (1) as below. The subscripts x and y indicate x coordinates and y coordinates of a position indicated by a modified symbol.

$$V3'_x = \begin{cases} P_{13,x} & |P_{13,x} - V1_x| < |P_{14,x} - V1_x| \\ P_{14,x} & |P_{13,x} - V1_x| \geq |P_{14,x} - V1_x| \end{cases} \quad (1)$$

$$V3'_y = \begin{cases} P_{13,y} & |P_{13,y} - V1_y| < |P_{14,y} - V1_y| \\ P_{12,y} & |P_{13,y} - V1_y| \geq |P_{14,y} - V1_y| \end{cases}$$

If the intersections $P_{12}$ and $P_{13}$ exist and the intersection $P_{14}$ does not exist, the new position V3' of the vertex V3 may be determined according to Equation (2) as below.

$$V3'_x = P_{13,x} \quad (2)$$

$$V3'_y = \begin{cases} P_{13,y} & |P_{13,y} - V1_y| < |P_{12,y} - V1_y| \\ P_{12,y} & |P_{13,y} - V1_y| \geq |P_{12,y} - V1_y| \end{cases}$$

If the intersections $P_{13}$ and $P_{14}$ exist and the intersection $P_{12}$ does not exist, the new position V3' of the vertex V3 may be determined according to Equation (3) as below.

$$V3'_x = \begin{cases} P_{13,x} & |P_{13,x} - V1_x| < |P_{14,x} - V1_x| \\ P_{14,x} & |P_{13,x} - V1_x| \geq |P_{14,x} - V1_x| \end{cases} \quad (3)$$

$$V3'_y = P_{13,y}$$

If only the intersection $P_{13}$ exists, the new position V3' of the vertex V3 may be determined according to Equation (4) as below.

$$V3'_x = P_{13,x}$$

$$V3'_y = P_{13,y} \quad (4)$$

In addition, new positions V2' and V4' of the vertices V2 and V4 may be determined according to the new position V3' according to Equation (5) as below.

$$(V2'_x, V2'_y) = (V2_x, V3'_y)$$

$$(V4'_x, V4'_y) = (V3'_x, V4_y) \quad (5)$$

Thus, in step S142, the evaluation frame arrangement unit 62 moves the vertices V2, V3, and V4 to the determined new positions V2', V3', and V4'.

3-2. Example of Processing Result

FIG. 12 is a diagram illustrating a result of re-arrangement of an evaluation frame according to an embodiment of the present invention.

Referring to FIG. 12, on image Im11a (the left image in FIG. 12) prior to evaluation frame re-arrangement, a side connecting the vertex V1 and the vertex V2 of the evaluation frame EF intersects the straight-line component L1. The diagonal connecting the vertex V1 and the vertex V3 intersects the straight-line component L2. The side connecting the vertex V1 and the V4 intersects the straight-line component L4. On image Im11b (the right image in FIG. 12) after evaluation frame re-arrangement, as the vertices V2, V3, and V4 are moved to the determined new positions V2', V3', and V4', the evaluation frame EF is downsized and does not intersect any straight-line component.

4. Second Embodiment of Evaluation Frame Re-arrangement Processing

Next, a second embodiment of evaluation frame re-arrangement processing of step S108 shown in FIG. 7 will be described in detail.

4-1. Processing Flow

Figure 13:
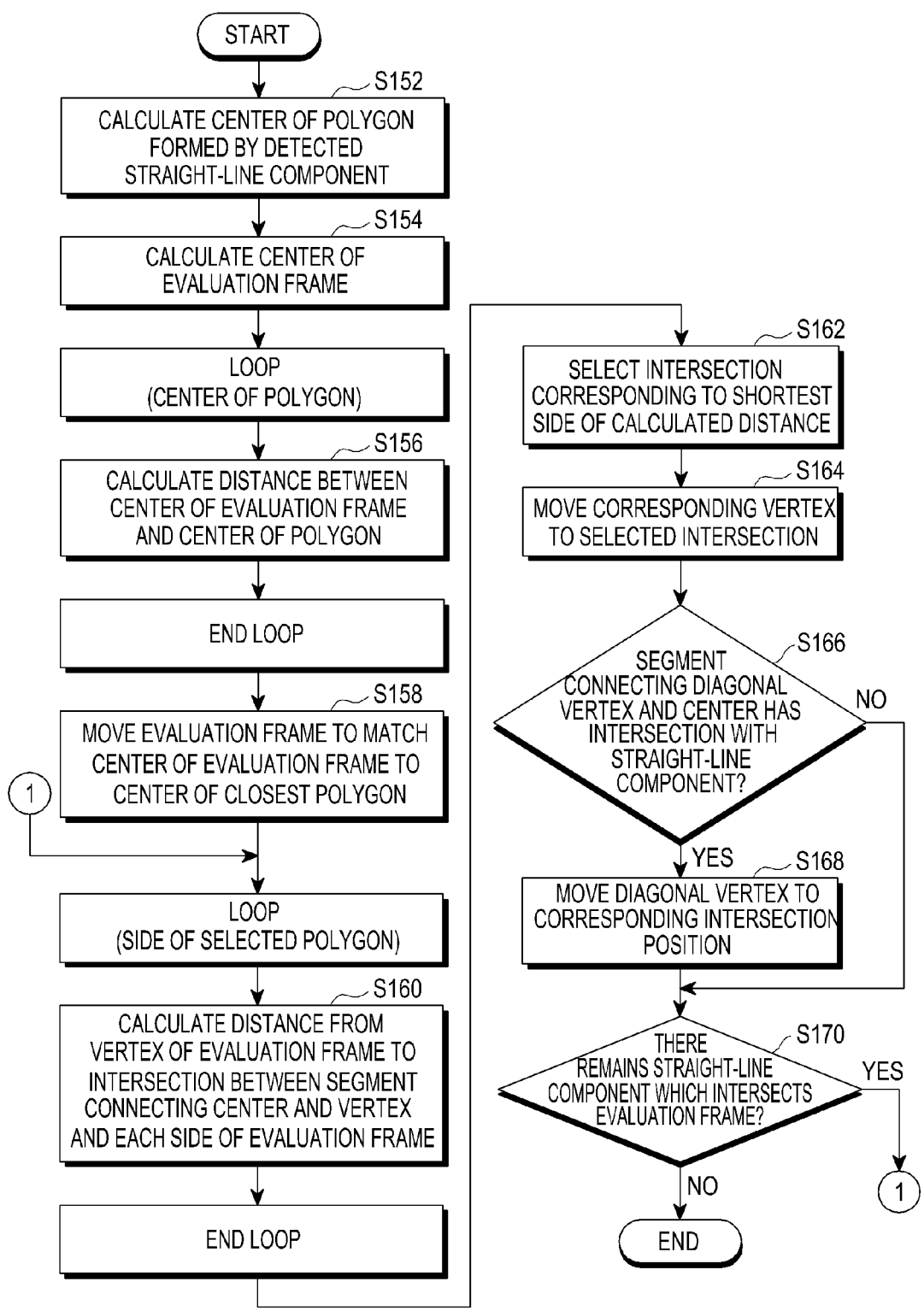
FIG. 13 is a flowchart illustrating an evaluation frame re-arrangement process according to an embodiment of the present invention.

FIG. 13 is a flowchart illustrating an evaluation frame re-arrangement process according to an embodiment of the present invention. Referring to FIG. 13, the evaluation frame arrangement unit 62 calculates a center of any polygon formed by straight-line components detected by the straight-line component detection unit 60 in step S152. The evaluation frame arrangement unit 62 also calculates a center of the evaluation frame at that time in step S154. Herein, the center of the evaluation frame may be calculated from a vertex position vector of a corresponding polygon or the evaluation frame according to Equation (6) as below.

$$\text{Position Vector of } i^{th} \text{ Vertex } \vec{a}_i \quad (6)$$

$$\text{Center } G = \sum_{i=1}^{N} \frac{\vec{a}_i}{N}$$

Figure 14:
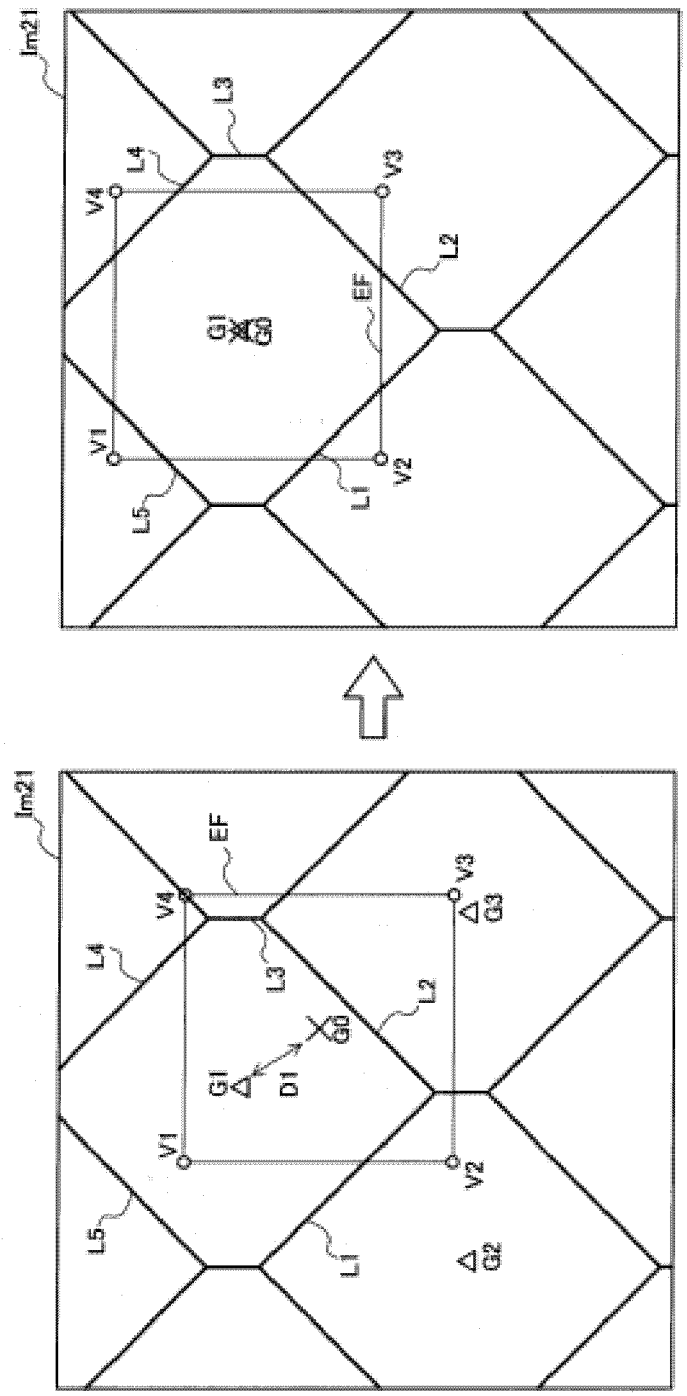
FIG. 14 is a diagram illustrating a state in which an evaluation frame is moved by an evaluation frame re-arrangement process according to an embodiment of the present invention.

Calculating the center of polygons formed by straight-line components continues with the loop beginning with step S156. Step S156 is repeated with respect to the center of any polygon calculated in step S154. The evaluation frame arrangement unit 62 calculates a distance between the center of the evaluation frame and the center of a polygon of interest in step S156. Referring to FIG. 14, a distance D1 between the center of the evaluation frame G0 ($G0_x$, $G0_y$) and the center of a polygon G1 ($G1_x$, $G1_y$) may be calculated as a Euclidian distance according to Equation (7) as below. The loop then ends.

$$D1 = \sqrt{(G0_x - G1_x)^2 + (G0_y - G1_y)^2} \quad (7)$$

Next, in step S158, the evaluation frame arrangement unit 62 moves the evaluation frame to cause the center of the evaluation frame to match the center of the closest polygon. A moving vector $(\Delta G_x, \Delta G_y)$ for moving the center of the evaluation frame and each vertex can be calculated according to Equation (8) as below.

$$(\Delta G_x, \Delta G_y) = (G1_x - G0_x, G1_y - G0_y) \quad (8)$$

FIG. 14 is a diagram illustrating a state in which the evaluation frame is moved by an evaluation frame re-arrangement process according to an embodiment of the present invention.

A polygon to which the evaluation frame is moved may be a polygon having the largest area, rather than the closest polygon.

Processing in a loop begins with step S160 which is repeated with respect to each side of the polygon selected in step S158. In step S160, the evaluation frame arrangement unit 62 calculates a distance from a corresponding vertex to an intersection between a segment connecting a new center and the vertex of the evaluation frame and each side of a polygon of interest. The loop then ends.

In step S162, the evaluation frame arrangement unit 62 selects an intersection corresponding to the shortest side of the calculated distance. In step S164, the evaluation frame arrangement unit 62 moves the corresponding vertex to the selected intersection.

Figure 15:
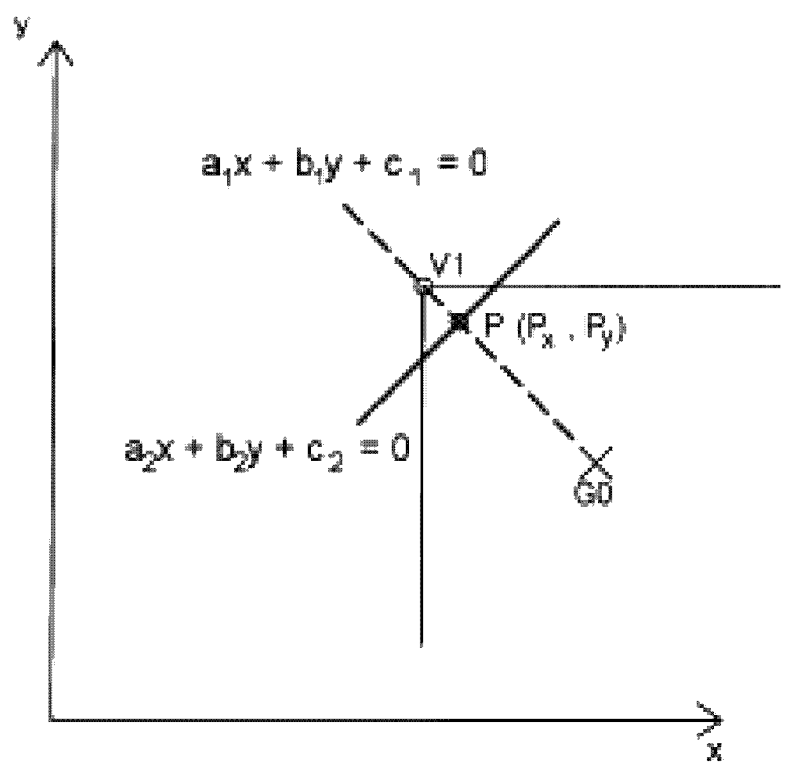
FIG. 15 is a diagram of a graph describing calculation of an intersection between a segment from a center of an evaluation frame to a vertex thereof and straight-line components according to an embodiment of the present invention.

FIG. 15 is a diagram of a graph describing calculation of an intersection between a segment from the center of an evaluation frame to a vertex thereof and straight-line components according to an embodiment of the present invention.

Referring to FIG. 15, assuming that a segment from a center of an evaluation frame to a vertex is $a1x+b1y+c1=0$ and a straight-line component corresponding to a portion of a shield is $a2x+b2y+c2=0$, an intersection $(P_x, P_y)$ between the segment and the straight-line component can be calculated according to Equation (9) as below.

$$(P_x, P_y) = \left( \frac{b_1 c_2 - b_2 c_1}{a_1 b_2 - a_2 b_1}, \frac{a_2 c_1 - a_1 c_2}{a_1 b_2 - a_2 b_1} \right) \quad (9)$$

In step S166 in FIG. 13, the evaluation frame arrangement unit 62 determines whether a segment connecting a vertex located diagonally with respect to the moved vertex and a center of the evaluation frame has an intersection with any straight-line component. If it is determined that the segment does not have any intersection, step S168 is skipped. Otherwise, if it is determined that the segment has an intersection, the evaluation frame arrangement unit 62 moves the diagonal vertex to the corresponding intersection in step S168.

In step S170, the evaluation frame arrangement unit 62 determines whether there remains any straight-line component which intersects the evaluation frame. If it is determined that there remains an intersecting straight-line component, the procedure returns to step S160. If it is determined that there remains no intersecting straight-line component, evaluation frame re-arrangement processing by the evaluation frame re-arrangement unit 62 is terminated.

4-2. Example of Processing Result

Figure 16:
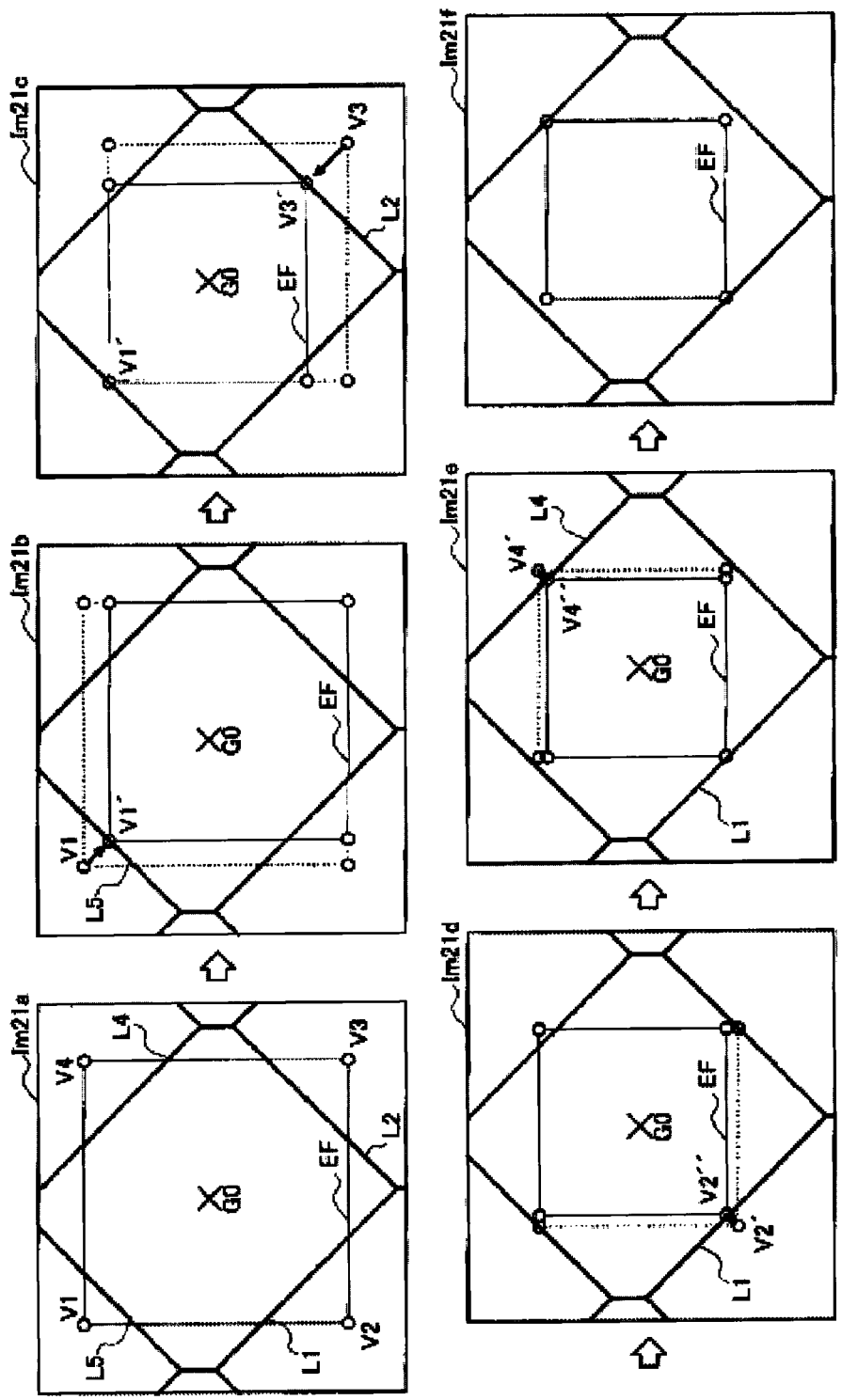
FIG. 16 is a diagram illustrating a state in which an evaluation frame is downsized by an evaluation frame re-arrangement process according to an embodiment of the present invention.

FIG. 16 is a diagram illustrating a state in which an evaluation frame is downsized by an evaluation frame re-arrangement process according to an embodiment of the present invention.

Shown in the left-top portion of FIG. 16 is image Im21a including an evaluation frame EF after the center G0 of the evaluation frame EF is moved to match the center of the polygon in step S158 of FIG. 13. On image Im21a, the evaluation frame EF intersects straight-line components L1, L2, L4, and L5. Thereafter, in step S164 of FIG. 13, the vertex V1 is moved to the new position V1' (see image Im21b, the center-top portion of FIG. 16).

In step S168 of FIG. 13, the diagonal vertex V3 with respect to the vertex V1 is moved to the new position V3' (see image Im21c, the right-top portion of FIG. 13). Step S164 of FIG. 13 is repeated according to a result of the determination of step S170, and the vertex V2' is moved to a new position V2'' (see image Im21d, the left-bottom portion of FIG. 16).

In step S168 of FIG. 13, the vertex V4' is moved to a new position V4'' (see image Im21e, the center-bottom portion of FIG. 16). A final result of such processing is shown on image Im21f in the right-bottom portion of FIG. 16 including the evaluation frame EF which is re-arranged so as to not overlap with any straight-line component.

5. Summary

So far, the examples including the structure of the imaging device 1 according to an embodiment of the present invention and two embodiments of evaluation frame re-arrangement processing have been described with reference to FIGS. 1 through 16.

According to the embodiments of the present invention, the evaluation frame used for calculation of an evaluation value for auto focus is automatically re-arranged so as to not overlap with a straight-line component detected in an image. Thus, even in a situation where a shield exists in front of an object, a user can focus the object with high precision without performing auxiliary manipulation.

Therefore, the possibility of the user forming a proper in-focus image without missing a shutter change can be improved. Moreover, when a distance between the object and the shield is short, because the evaluation frame is re-arranged to avoid the shield, the shield is prevented from being mistakenly in focus.

In a first embodiment, the evaluation frame can be re-arranged by simply avoiding the shield with low computational cost, without needing to be moved by a large amount. In a second embodiment, the evaluation frame is downsized after the center thereof is moved to the center of the polygon formed by the detected straight-line components, thereby reducing a possibility of excessive downsizing of the evaluation frame, such that proper evaluation for focusing position determination can be maintained.

In addition, in the above-descried embodiments, the evaluation frame is mainly moved or downsized. However, for example, if the vertex of the evaluation frame is movable in a direction that the evaluation frame is enlarged in a positional relationship between the polygon formed by the straight-line components and the evaluation frame, the vertex of the evaluation frame can be moved in that direction.

As described above, according to the present invention, when a shield exists in front of the object, the user can focus the object without performing auxiliary manipulation.

While certain embodiments of the present invention have been described with reference to the accompanying drawings, the present invention is not limited to those embodiments. It will be apparent to those of ordinary skill in the art that various changes or modifications may be possible within the scope of the claims, and such changes or modifications are also understood to be included in the scope of the present invention.

What is claimed is:

1. An imaging device comprising:
   an imaging unit for converting light passing through a focus lens into an image signal to obtain an image;
   an arrangement unit for arranging an evaluation frame on the image obtained by the imaging unit;

a determination unit for determining a focusing position of the focus lens based on pixel value evaluation in the evaluation frame arranged by the arrangement unit; and a driving unit for moving the focus lens to the focusing position determined by the determination unit, wherein the arrangement unit automatically re-arranges the evaluation frame by modifying the evaluation frame when a straight-line component appearing on the image overlaps with the evaluation frame.

2. The imaging device of claim 1, further comprising:

a straight-line component detection unit for detecting the straight-line component obtained by the imaging unit, wherein the arrangement unit determines whether the straight-line component detected by the straight-line component detection unit overlaps with the evaluation frame and, if it is determined that the straight-line component overlaps with the evaluation frame, re-arranges the evaluation frame to avoid overlap between the straight-line component and the evaluation frame.

3. The imaging device of claim 2, wherein the arrangement unit, after fixing a point of the evaluation frame, downsizes the evaluation frame to avoid overlap between each side of the evaluation frame and the straight-line component.

4. The imaging device of claim 2, wherein when the straight-line component forms a polygon, the arrangement unit moves the evaluation frame such that a center of the evaluation frame matches a center of the polygon formed by the straight-line component.

5. The imaging device of claim 4, wherein the arrangement unit, after fixing the center of the evaluation frame, downsizes the evaluation frame to avoid overlap between each side of the evaluation frame and the straight-line component appearing on the image.

6. The imaging device of claim 1, wherein the arrangement unit modifies the evaluation frame by downsizing the evaluation frame.

7. The imaging device of claim 6, wherein the arrangement unit modifies the evaluation frame by moving the evaluation frame.

8. The imaging device of claim 1, wherein the arrangement unit modifies the evaluation frame by enlarging the evaluation frame.

9. An image capturing method in an imaging device, the image capturing method comprising:

converting light passing through a focus lens into an image signal to obtain an image;

arranging an evaluation frame on the image;

determining a focusing position of the focus lens based on pixel value evaluation in the evaluation frame;

moving the focus lens to the determined focusing position; and automatically re-arranging the evaluation frame by modifying the evaluation frame when a straight-line component appearing on the image overlaps with the evaluation frame.

10. The image capturing method of claim 9, wherein automatically re-arranging the evaluation frame comprises:

determining whether the detected straight-line component overlaps with the evaluation frame; and if it is determined that the straight-line component overlaps with the evaluation frame, automatically re-arranging the evaluation frame to avoid overlap between the straight-line component and the evaluation frame.

11. The image capturing method of claim 10, wherein automatically re-arranging the evaluation frame comprises, after fixing a point of the evaluation frame, downsizing the evaluation frame to avoid overlap between each side of the evaluation frame and the straight-line component.

12. The image capturing method of claim 10, wherein automatically re-arranging the evaluation frame comprises moving the evaluation frame such that a center of the evaluation frame matches a center of a polygon formed by the straight-line component.

13. The image capturing method of claim 12, wherein automatically re-arranging the evaluation frame comprises, after fixing the center of the evaluation frame, downsizing the evaluation frame to avoid overlap between each side of the evaluation frame and the straight-line component appearing on the image.

14. The image capturing method of claim 9, wherein automatically re-arranging the evaluation frame comprises modifying the evaluation frame by downsizing the evaluation frame.

15. The image capturing method of claim 14, wherein automatically re-arranging the evaluation frame comprises modifying the evaluation frame by moving the evaluation frame.

16. The image capturing method of claim 9, wherein automatically re-arranging the evaluation frame comprises modifying the evaluation frame by enlarging the evaluation frame.

17. The image capturing method of claim 16, wherein automatically re-arranging the evaluation frame comprises modifying the evaluation frame by moving the evaluation frame.

18. An imaging device comprising:

an imaging unit for converting light passing through a focus lens into an image signal to obtain an image;

an arrangement unit for arranging an evaluation frame on the image obtained by the imaging unit;

a determination unit for determining a focusing position of the focus lens based on pixel value evaluation in the evaluation frame arranged by the arrangement unit; and a driving unit for moving the focus lens to the focusing position determined by the determination unit, wherein the arrangement unit automatically re-arranges the evaluation frame by downsizing and moving the evaluation frame when a straight-line component appearing on the image overlaps with the evaluation frame.

* * * * *